US012732898B2

(12) United States Patent
Niemi

(10) Patent No.: US 12,732,898 B2
(45) Date of Patent: Sep. 8, 2026

(54) HANDLING PERIODIC PLMN SEARCH DURING UNAVAILABILITY PERIOD

(71) Applicant: MediaTek Singapore Pte. Ltd., Singapore (SG)

(72) Inventor: Marko Niemi, Oulu (FI)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 198 days.

(21) Appl. No.: 18/387,880

(22) Filed: Nov. 8, 2023

(65) Prior Publication Data

US 2024/0187973 A1 Jun. 6, 2024

Related U.S. Application Data

(60) Provisional application No. 63/385,635, filed on Dec. 1, 2022.

(51) Int. Cl.
*H04W 48/16* (2009.01)
*H04W 48/18* (2009.01)
*H04W 60/00* (2009.01)

(52) U.S. Cl.
CPC ........... *H04W 48/16* (2013.01); *H04W 48/18* (2013.01); *H04W 60/00* (2013.01)

(58) Field of Classification Search
CPC ..... H04W 84/06; H04W 48/18; H04W 60/06; H04W 36/22; H04W 48/06; H04W 48/12; H04W 48/16; H04W 60/00; H04W 60/04; H04W 76/28; H04W 8/02; H04W 8/08; H04W 8/183; H04W 8/22; H04W 84/04
See application file for complete search history.

(56) References Cited

U.S. PATENT DOCUMENTS 12,389,361 B1 * 8/2025 Yu ........................... H04W 8/08
12,426,001 B1 * 9/2025 Yu ....................... H04W 36/322
2023/0012328 A1 1/2023 Kumar et al.
2023/0254803 A1 * 8/2023 Lu ......................... H04W 48/16
455/435.1

(Continued)

FOREIGN PATENT DOCUMENTS

EP 4546940 A1 4/2025
EP 4550892 A1 * 5/2025 ............ H04W 48/18

(Continued)

OTHER PUBLICATIONS

3GPP TS 23.122 v18.0.0 Sep. 2022 (Year: 2022).*

(Continued)

*Primary Examiner* — Matthew C Sams
(74) *Attorney, Agent, or Firm* — troutman pepper locke; Tim Tingkang Xia, Esq.

(57) ABSTRACT

In an aspect of the disclosure, a method, a computer-readable medium, and an apparatus are provided. The apparatus may be a UE. In certain configurations, the UE activates an unavailability period. The UE postpones one or more periodic attempts to perform a Public Land Mobile Network (PLMN) search when the UE is in the unavailability period. The unavailability period may be activated by transmitting, to a network, a request message indicating a duration of the unavailability period. The request message may be a mobility registration update message or a UE-initiated deregistration message.

16 Claims, 13 Drawing Sheets

(56) References Cited

U.S. PATENT DOCUMENTS

| | | | | |
|---|---|---|---|---|
| 2023/0362704 | A1 | 11/2023 | Edge et al. | |
| 2024/0298164 | A1 | 9/2024 | Höglund et al. | |
| 2024/0324010 | A1* | 9/2024 | Puneet | H04W 60/04 |
| 2024/0381207 | A1* | 11/2024 | Puneet | H04W 36/22 |
| 2025/0212152 | A1* | 6/2025 | Gupta | H04W 60/00 |

FOREIGN PATENT DOCUMENTS

| | | | | |
|---|---|---|---|---|
| EP | 4572414 A1 * | 6/2025 | | H04W 48/16 |
| WO | WO-2024005429 A1 * | 1/2024 | | H04W 48/18 |
| WO | WO-2024035062 A1 * | 2/2024 | | H04W 48/16 |
| WO | WO-2025037851 A1 * | 2/2025 | | H04W 48/18 |
| WO | WO-2025037916 A1 * | 2/2025 | | H04W 60/06 |

OTHER PUBLICATIONS

3GPP SA WG2 Meeting #153E "Support of unavailability period" Oct. 10, 2022 (Year: 2022).*
3GPP TR 23.700-28 v0.3.0 (May 2022) (Year: 2022).*
Translation of WO-2024035062-A1 (Year: 2022).*
Translation of WO-2024005429-A1 (Year: 2022).*
Taiwan Patent Office "Office Action" Aug. 9, 2024, Taiwan.
Taiwan Patent Office "Office Action" Aug. 27, 2024, Taiwan.
3GPP TSG-CT WG1 Meeting #135-e, C1-222626, E-Meeting, Apr. 6-12, 2022.
3GPP TS 24.501 V17.2.0 (Mar. 2021), 3rd Generation Partnership Project; Technical Specification Group Core Network and Terminals; Non-Access-Stratum (NAS) protocol for 5G System (5G5); Stage 3; (Release 17).
3GPP SA WG2 Meeting #153E, S2-2209160, Oct. 10-17, 2022, Electronic meeting.
SA WG2 Meeting #157, S2-2306564, Berlin, Germany, May 22-26, 2023.
3GPP SA WG2 Meeting #153E, Oct. 10-17, 2022, Electronic meeting, S2-2209160.
3rd Generation Partnership Project; Technical Specification Group Services and System Aspects; Study on Seamless UE context recovery (Release 18), 3GPP TR 23.700-61 V18.0.0 (Jun. 2022).
3GPP TSG-CT WG1 Meeting #144 C1-237071, Xiamen, China, Oct. 9-13, 2023.
European Search Report, May 3, 2024, Germany.
SA WG2 Meeting #157, Berlin, Germany, May 22-26, 2023, S2-2306564(was S2-2204208r06), Closing ENs for the procedures for discontinuous coverage reporting.
3GPP TS 23.122 V18.0.0 (Sep. 2022), 3rd Generation Partnership Project; Technical Specification Group Core Network and Terminals; Non-Access-Stratum (NAS) functions related to Mobile Station (MS) in idle mode (Release 18).
3GPP TR 23.700-61 V18.0.0 (Jun. 2022), 3rd Generation Partnership Project; Technical Specification Group Services and System Aspects; Study on Seamless UE context recovery (Release 18).
3GPP TR 23.700-28 V0.3.0 (May 2022), 3rd Generation Partnership Project; Technical Specification Group Services and System Aspects; Study on satellite access, Phase 2 (Release 18).
3GPP SA WG2 Meeting #153E, S2-2209160, Oct. 10-17, 2022, Electronic meeting, Support of unavailability period.
European Patent Office, Dec. 4, 2025, Germany.
3GPP TS24.301 V18.0.0 (Sep. 2022), 3rd Generation Partnership Project; Technical Specification Group Core Network and Terminals; Non-Access-Stratum (NAS) protocol for Evolved Packet System (EPS) Stage 3 (Release 18). https://cloud.hoefer-pat.de/s/xTqosymoNAYJqQR.
3GPP TS 24.301 V18.0.0 (Sep. 2022), 3rd Generation Partnership Project; Technical Specification Group Core Network and Terminals; Non-Access-Stratum (NAS) protocol for Evolved Packet System (EPS); Stage 3, (Release 18).

* cited by examiner

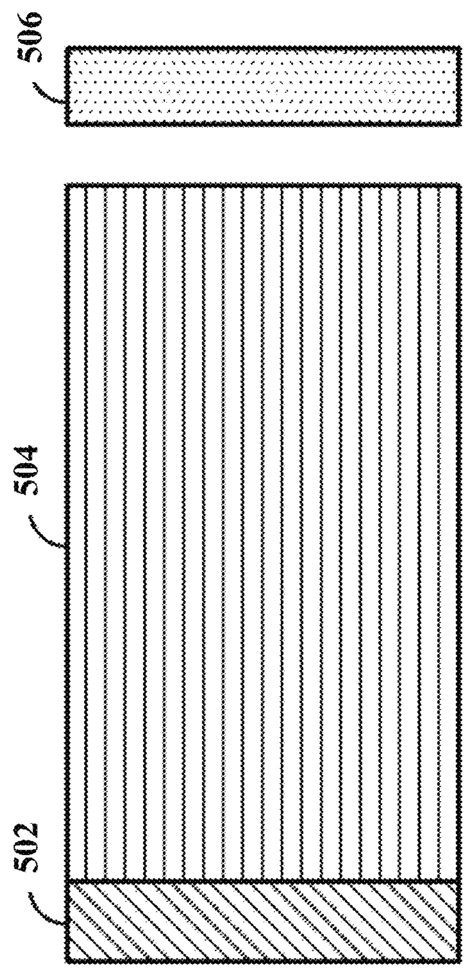
FIG. 5
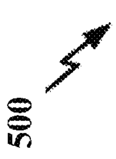
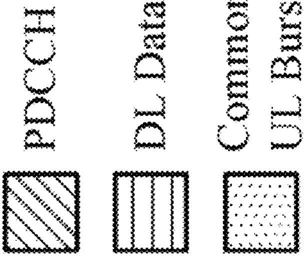

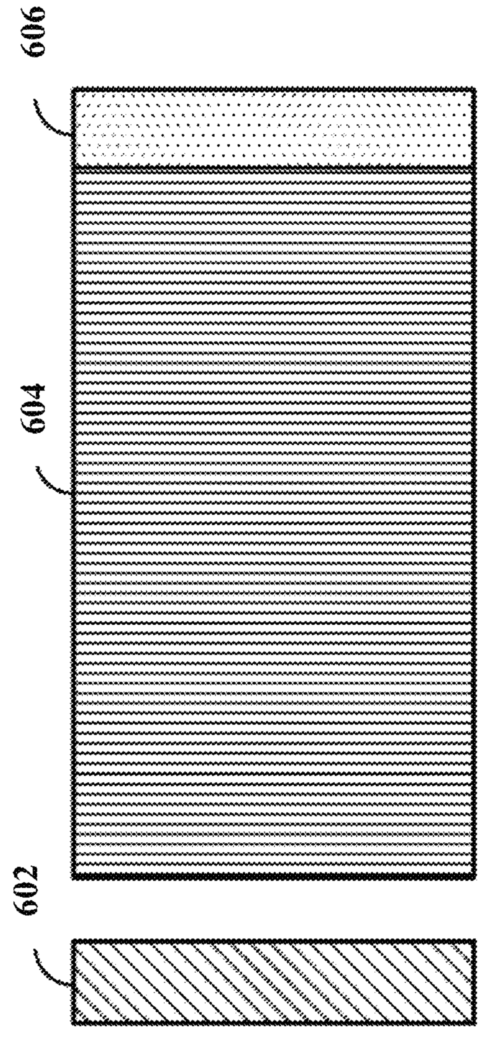
FIG. 6
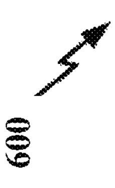
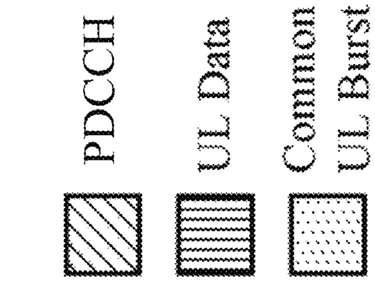

900

HANDLING PERIODIC PLMN SEARCH DURING UNAVAILABILITY PERIOD

CROSS-REFERENCE TO RELATED APPLICATION(S)

This application claims the benefits of U.S. Provisional Application Ser. No. 63/385,635, entitled "HANDLING OF NAS TIMERS DURING UNAVAILABILITY PERIOD" and filed on Dec. 1, 2022, which is expressly incorporated by reference herein in their entirety.

BACKGROUND

Field

The present disclosure relates generally to communication systems, and more particularly, to techniques of methods and apparatuses for handling periodic Public Land Mobile Network (PLMN) search during an unavailability period.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. In certain configurations, the UE activates an unavailability period. The UE postpones one or more periodic attempts to perform a Public Land Mobile Network (PLMN) search when the UE is in the unavailability period.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is a diagram showing an example of a DL-centric slot.

FIG. 6 is a diagram showing an example of an UL-centric slot.

DETAILED DESCRIPTION

Figure 1:
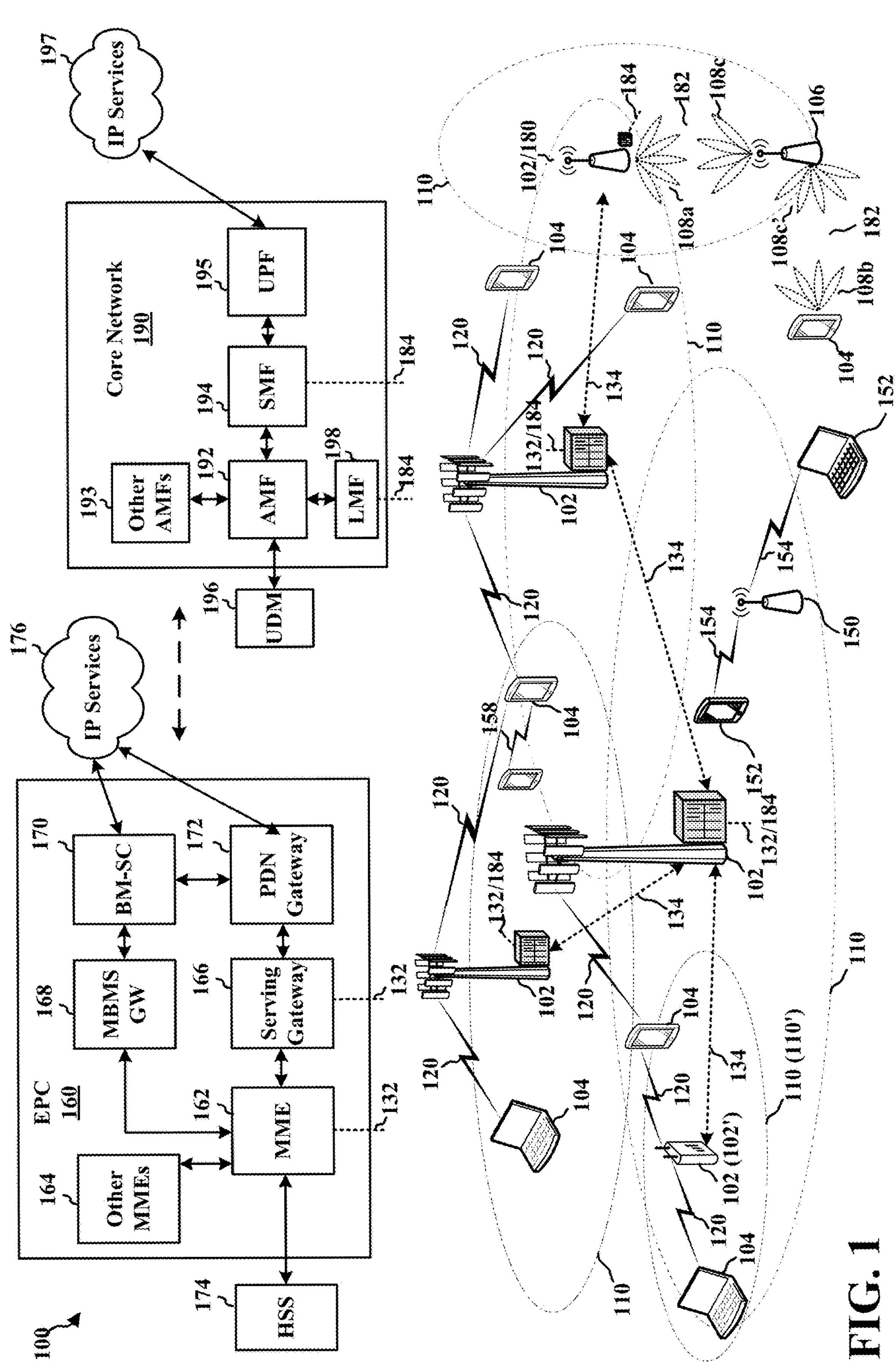
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102" may employ NR and use the same 5 GHz unlicensed frequency spectrum as used by the Wi-Fi AP 150. The small cell 102", employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHZ and 30 GHZ, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108*a*. The UE 104 may receive the beamformed signal from the base station 180 in one or more receive directions 108*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
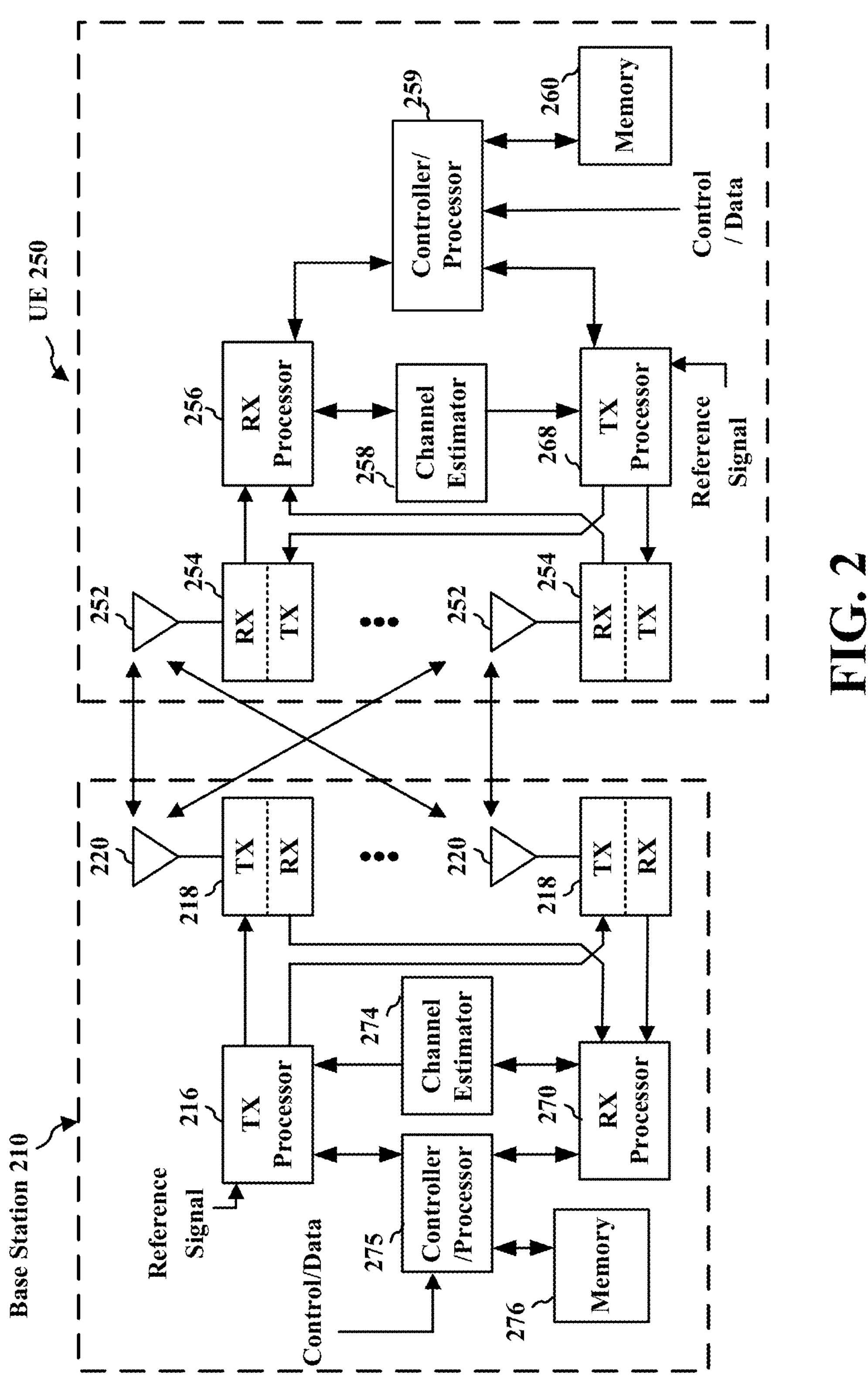
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting: PDCP layer functionality associated with header compression/decompression, security (ciphering, deciphering, integrity protection, integrity verification), and handover support functions: RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs: and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate mapping matching, onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting: PDCP layer functionality associated with header compression/decompression, and security (ciphering, deciphering, integrity protection, integrity verification): RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210) may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHZ), massive MTC (mMTC) targeting non-backward compatible MTC techniques, and/or mission critical targeting ultra-reliable low latency communications (URLLC) service.

A single component carrier bandwidth of 100 MHz may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
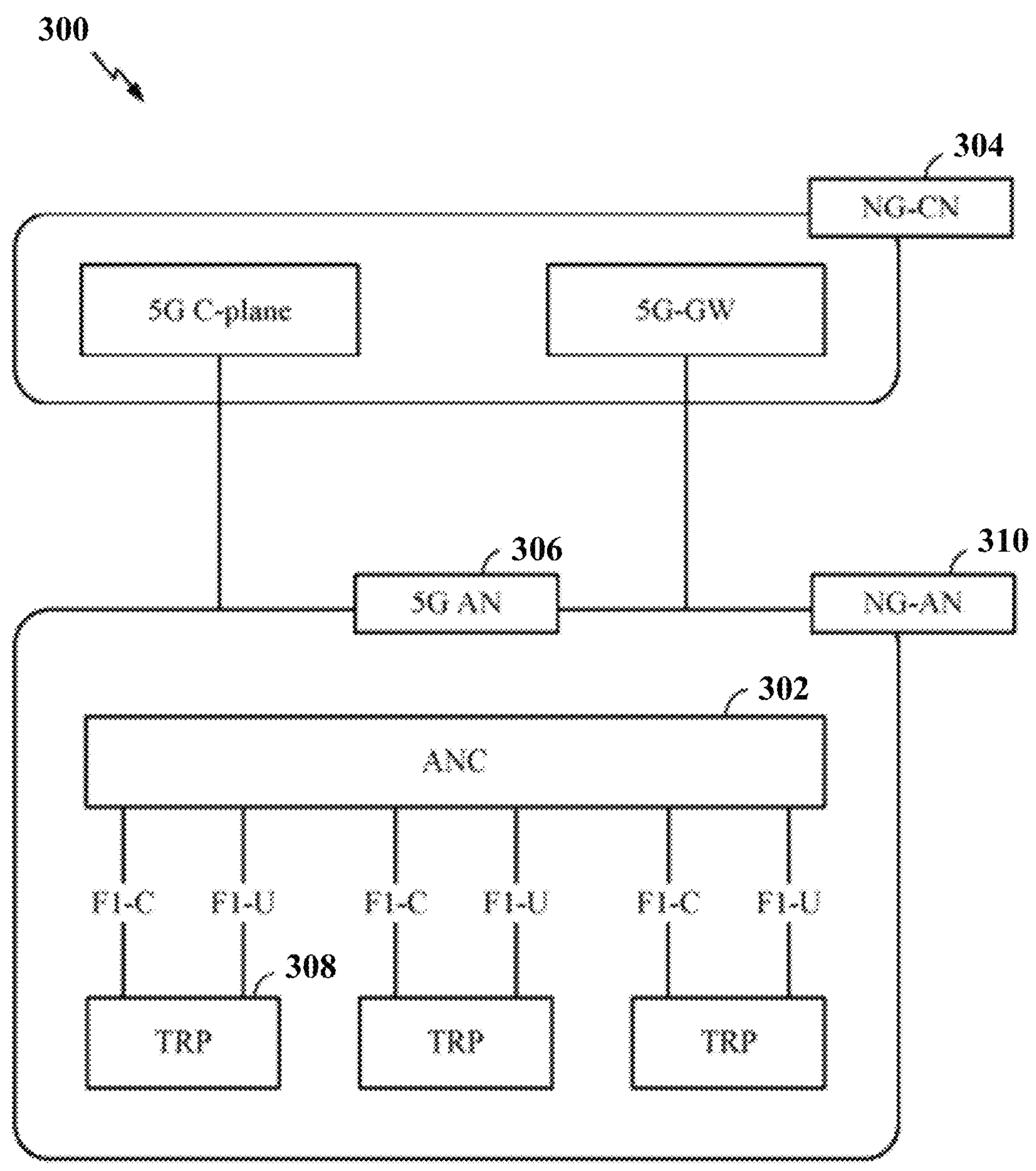
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
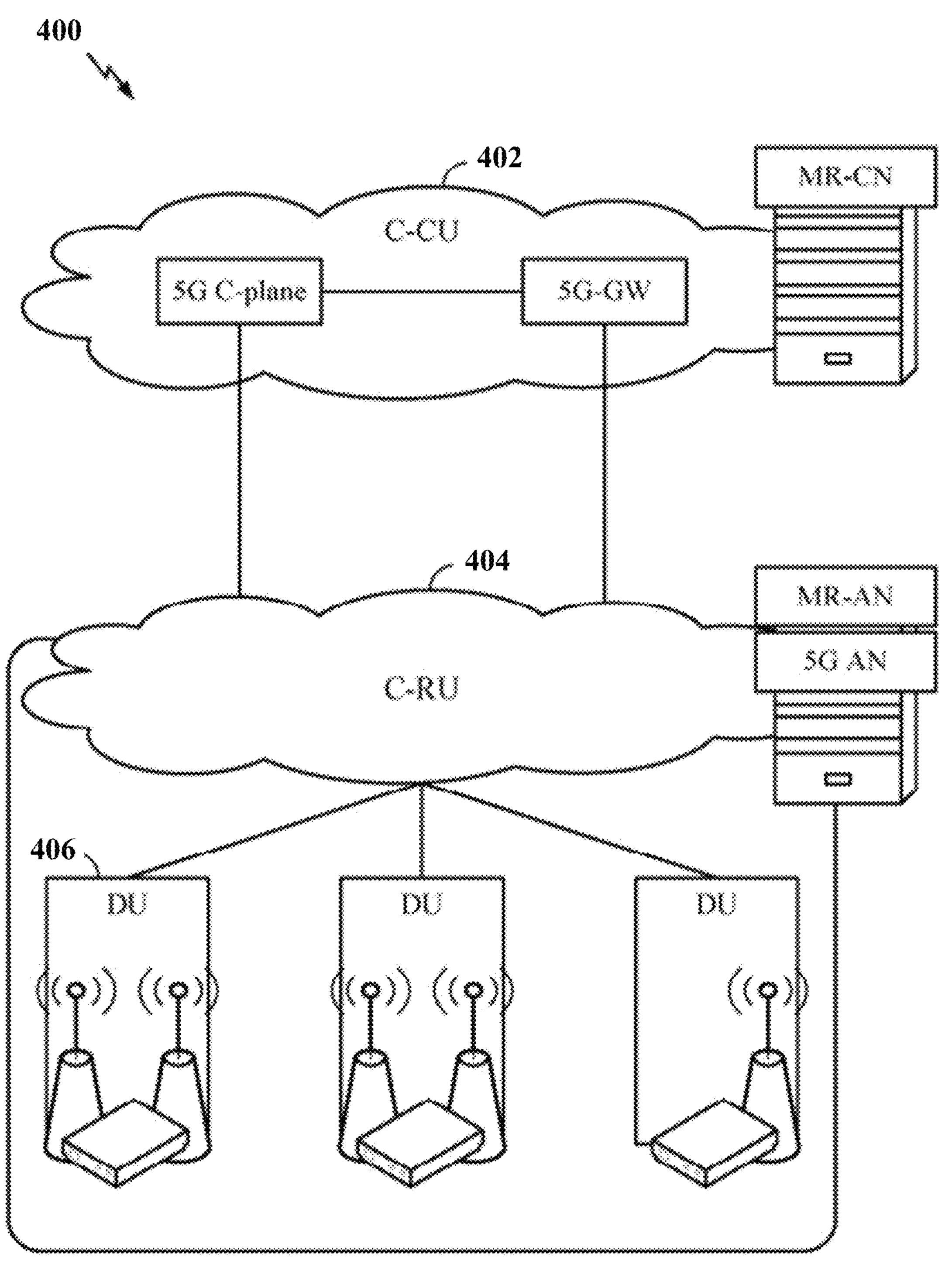
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In certain configurations, the UE may be required to execute certain events, for example, an OS upgrade procedure, silent rest at modem, or binary updates such as modem software updates. In this case, once the UE has downloaded the binary, the time when the UE performs the upgrade is left for the UE implementation. When the UE becomes unavailable to execute such events, it can affect critical operations of an application server if the availability of the UE is not correctly configured during an unavailability period (i.e., a period of time during which the UE is not available) as described in 3GPP Technical Specification (TS) 24.501. Thus, there is a need for coordination between the UE and operator/application function.

Figure 7:
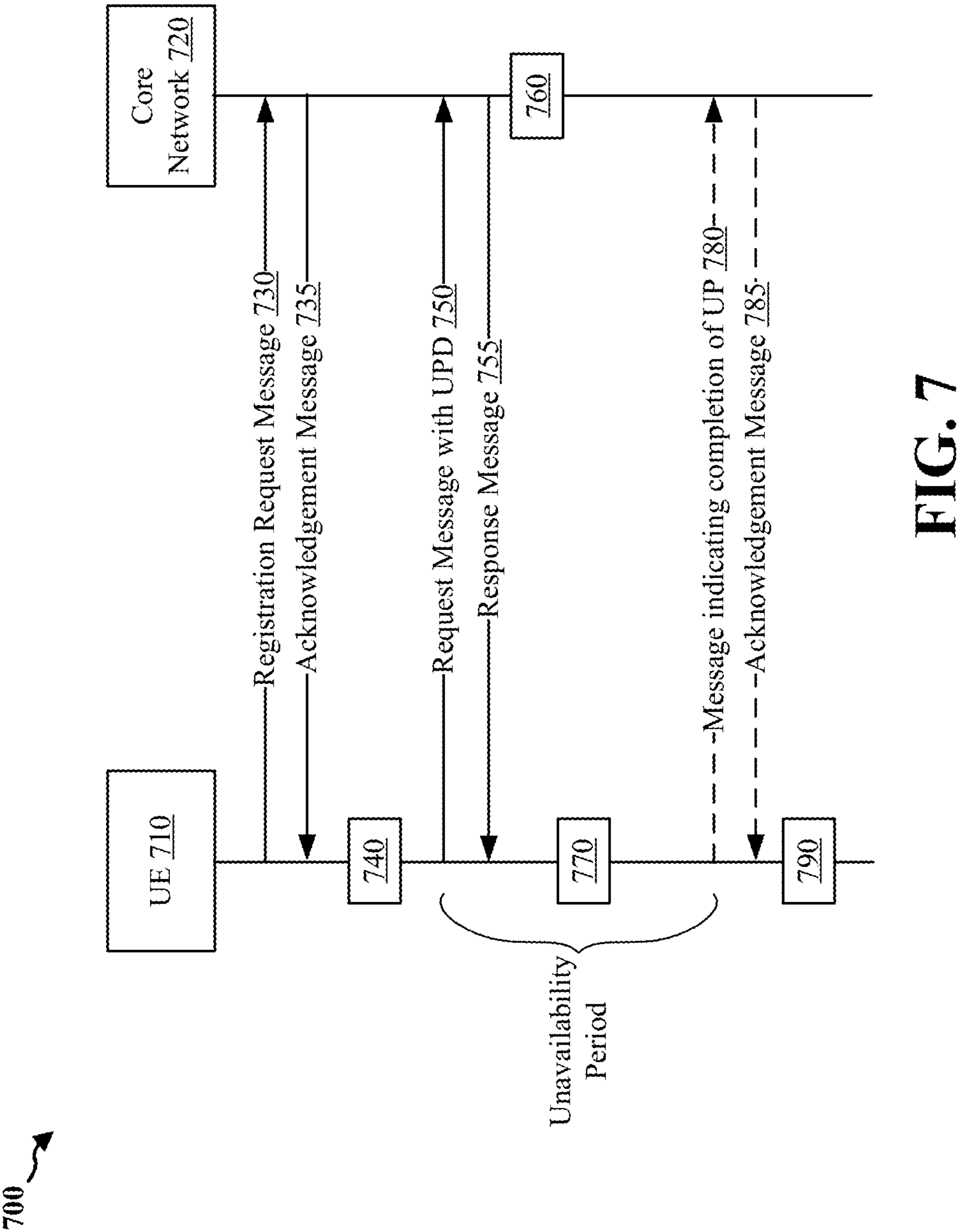
FIG. 7 is a diagram illustrating an example procedure between a UE and a core network.

FIG. 7 is a diagram illustrating an example procedure between a UE and a core network. Specifically, the UE 710 and the core network 720 may both support the unavailability period feature. In certain configurations, the core network 720 may be represented by the AMF in the 5GS core network or the MME in the EPS core network. As shown in FIG. 7, when the UE 710 is within the NR satellite access coverage of the core network 720, the UE 710 sends a registration request 730 to the core network 720 to become registered. Upon receiving the registration request from the UE 710, the core network 720 sends an acknowledgement message 735 back to the UE 710 to confirm the receipt of the registration request 730. In this case, the UE 710 enters a registered mode. In certain configurations, the acknowledgement message 735 includes information of a value for a periodic registration update time, during which the registration state of the UE is considered valid. Upon receiving the acknowledgement message 735, the UE 710 may set a periodic registration timer (e.g., a T3512 timer) based on the periodic registration update time, such that the UE 710 may perform a periodic registration process at the expiration of the periodic registration timer.

At operation 740, an event occurs to trigger the UE 710 to enter the unavailability period, such that the UE 710 may be deemed unavailable for a period of time. Specifically, the event triggering the UE 710 to enter the unavailability period may include: (1) UE-specific events, e.g., the UE 710 performing a software update, or power saving events (e.g., deactivating the radio power of the UE 710); and (2) the UE 710 detecting that it is losing satellite access coverage of the core network 720, i.e., the UE is due to NR satellite access discontinuous coverage.

Upon being trigger by the event, the UE 710 sends a request message 750 to the core network 720 to indicate information of the unavailability period. In certain configurations, the request message 750 may be a mobility registration update (MRU) message or a UE-initiated deregistration message. In one embodiment, the request message 750 may include information related to the unavailability period, such as the indication and type of unavailability, the start of the unavailability period (if known), and an unavailability period duration (UPD) (if known). Upon receiving the request message 750 from the UE 710, the core network 720 sends a corresponding response message 755 back to the UE 710 to confirm receipt of the request message 750. At operation 760, the core network 720 stores the information related to the unavailability period in the UE context and determines that the UE 710 is not reachable during the UPD. In this case, the core network 720 does not page the UE 710 during the UPD.

In certain configurations, the core network 720 may set an unavailability period timer based on the information related to the unavailability period in the request message 750. In one embodiment, the unavailability period timer is set based on the information of the start of the unavailability period and the UPD in the request message 750. In an alternative embodiment, if the message 750 does not include the information of the start of the unavailability period, the core network 720 may consider implicitly the start of the unavailability period to be the time the core network 720 receives the request message 750, and set the unavailability period timer accordingly. In yet another alternative embodiment, if the request message 750 does not include the UPD, the core network 720 may determine the UPD based on the type of unavailability and other information available to the core network 720, and set the unavailability period timer accordingly.

In certain configurations, the response message 755 sent by the core network 720 may include additional information related to the certain UE procedures. For example, as discussed, when the UE 710 performs the registration process by sending the registration request message 730 to the core network 720, the core network 720 sends back the acknowledgement message 735 to the UE 710 to include information of a value for a periodic registration update time, such that the UE 710 may set the periodic registration timer (e.g., the T3512 timer) based on the periodic registration update time. In certain configurations, since the UE 710 is now triggered to enter the unavailability period, when the core network 720 receives the request message 750 with the information related to the unavailability period, the core network 720 may determine an updated value for the periodic registration update time, and include the updated value for the periodic registration update time in the response message 755, such that the UE 710 may update the periodic registration timer based on the updated value of the periodic registration update time in the response message 755. In certain configurations, the updated periodic registration update time may be longer than or equal to the UPD, such that the periodic registration timer (e.g., the T3512 timer) does not expire during the unavailability period. In other words, the UE 710 does not have to perform the periodic registration during the unavailability period. In this case, the UE 710 and the core network 720 may match the periodic registration timer to the unavailability period without a conflict therebetween.

In certain configurations, since the core network 720 considers the UE 710 to be unreachable during the unavailability period, the core network 720 may determine whether the UE 710 is required to perform a further registration procedure when the unavailability period ends. Thus, the core network 720 may include the information as to whether the UE 710 is required to perform a further registration procedure when the unavailability period ends in the response message 755, such that the UE 710, upon receiving the response message 755, may determine whether it is required to perform a further registration procedure when the unavailability period ends.

When the UE 710 enters the unavailability period, a periodic attempt timer, which is used to trigger PLMN search, may keep running. Specifically, the periodic attempt timer is set with a value of the pre-configured periodic attempt time, and is "periodic" such that when a current periodic attempt timer expires, the UE 710 may restart a new periodic attempt timer with the value of the pre-configured periodic attempt time. When the UE 710 enters the unavailability period and the periodic attempt timer is running, the UE 710 does not stop the periodic attempt timer. Examples of the PLMN search may include, without being limited to, performing periodic scan or attempting to access a home PLMN (HPLMN) or an equivalent PLMN (EHPLMN) or other higher priority PLMN. Generally, when the UE 710 is not in the availability period, the expiration of the periodic attempt timer indicates a trigger to the UE 710 with an attempt to perform the PLMN search, e.g., performing periodic scan or attempting to access the HPLMN or the EHPLMN or other higher priority PLMN. At operation 770, during the unavailability period, the UE 710 may postpone the attempt (or multiple attempts) to perform the PLMN search since the unavailability period is activated. Specifically, as discussed, one of the events that may trigger the unavailability period may be for power-saving purposes, and the UE 710 may save power by postponing the attempt to perform the PLMN search during the unavailability period. Thus, the UE 710 may check the UE availability status (e.g., whether the UE 710 is flagged to be in the unavailability period, or whether an unavailability period timer is still running) when the periodic attempt timer expires, thus determining whether the expiration of the periodic attempt timer is during the unavailability period. When the periodic attempt timer expires during the unavailability period, the expiration of the periodic attempt timer does not trigger the UE 710 to perform the PLMN search. Thus, when the periodic attempt timer expires during the unavailability period, the UE 710 does not perform the PLMN search, e.g., not attempting to perform periodic scan or attempting to access the HPLMN or the EHPLMN or other higher priority PLMN during the unavailability period. Instead, the UE 710 waits until the end of the unavailability period to perform the postponed attempt for the PLMN search. In other words, when the periodic attempt timer expires during the unavailability period, the UE 710 attempts to perform periodic scan or attempts to access the HPLMN or the EHPLMN or other higher priority PLMN only after the unavailability period ends.

As discussed, the UE 710 may determine whether it is required to perform a further registration procedure when the unavailability period ends based on the information in the response message 755. Optionally, if the response message 755 indicates that there is a need for the UE 710 to perform the further registration procedure, when the unavailability period ends, the UE 710 sends a message 780 to the core network 720 to indicate completion of the unavailability period. In certain configurations, the message 780 may be another mobility registration update message for updating the registration status of the UE 710, or may be a registration request message if the UE 710 has previously de-registered with the UE-initiated deregistration message as the request message 750). Upon receiving the message 780, the core network 720 sends an acknowledgement message 785 back to the UE 710 to confirm receipt of the message 780). As discussed, at operation 760, the core network 720 stores the information related to the unavailability period in the UE context and determines that the UE 710 is not reachable during the UPD. On the other hand, if the response message 755 indicates that there is no need for the UE 710 to perform the further registration procedure, the UE 710 may choose not to send the message 780), and there will be no acknowledgement message 785.

At operation 790, the UE 710 may perform the postponed attempt for the PLMN search, e.g., attempting to perform periodic scan or attempting to access the HPLMN or the EHPLMN or other higher priority PLMN based on the postponed attempt(s). In certain configurations, there may be multiple attempts (i.e., multiple expirations of the periodic attempt timer) being postponed during the unavailability period, and the UE 710 may perform one PLMN search after the unavailability period regardless of the quantity of the postponed attempt(s) during the unavailability period.

In certain configurations, the unavailability period may end at the intended UPD. However, it is also possible that the unavailability period may end earlier than the intended UPD, e.g., when the triggering event ends prematurely due to the event being delayed or canceled.

Figure 8:
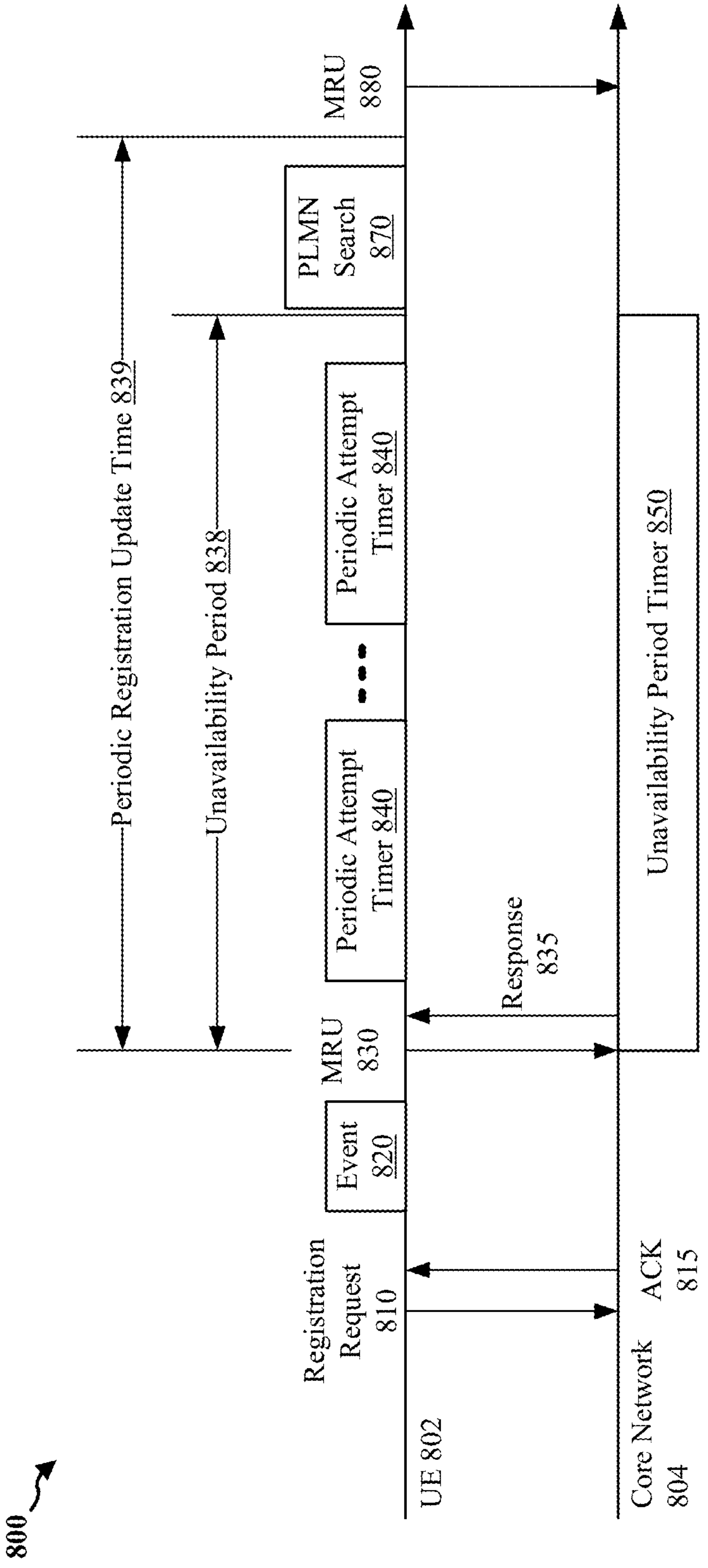
FIG. 8 is a diagram illustrating an example of a UE postponing attempts to perform PLMN search during an unavailability period duration.

FIG. 8 is a diagram illustrating an example of a UE postponing attempts to perform PLMN search during an unavailability period duration. Specifically, in the procedure 800, the UE 802 (i.e., the UE 710) utilizes a MRU message to indicate the unavailability period to the core network 804 (i.e., the core network 720), and the core network 804 acknowledges the MRU message by indicating that the UE 802 does not need to perform a further registration process at the end of the unavailability period.

As shown in FIG. 8, when the UE 802 is within the NR satellite access coverage of the core network 804, the UE 802 sends a registration request 810 to the core network 804 to become registered. Upon receiving the registration request from the UE 802, the core network 804 sends an acknowledgement message (i.e., ACK 815) back to the UE 802 to confirm the receipt of the registration request 810, allowing the UE 802 to enter a registered mode. As discussed, the ACK 815 may include information of a value for a periodic registration update time, such that the UE 802 may set a periodic registration timer (e.g., a T3512 timer) based on the periodic registration update time.

When the UE 802 detects an event 820 that triggers the UE 802 to enter the unavailability period, the UE 802 sends a MRU message 830 to the core network 804 to indicate information of the unavailability period 838. Specifically, the MRU message 830) may include information related to the unavailability period, such as the indication and type of unavailability, the start of the unavailability period (if known), and the UPD (if known). At the core network 804, upon receiving the MRU message 830, the core network 804 sets an unavailability period timer 850 based on the start of the unavailability period and the UPD, and sends a response message 835 back to the UE 802. In this case, the response message 835 includes information indicating that the UE 802 is not required to perform a further registration procedure at the end of the unavailability period. Further, the response message 835 includes information of an updated value for the periodic registration update time, such that the UE 802 may update the periodic registration timer with the updated value of the periodic registration update time 839. As shown in FIG. 8, the periodic registration update time 839 is longer than the unavailability period 838, thus ensuring that the UE 802 does not perform any registration update procedure during the unavailability period 838. In certain configurations, the periodic registration update time 839 may be longer than or equal to the duration of the unavailability period 838.

During the unavailability period 838, the periodic attempt timer 840 may keep running on the UE 802. It is possible that the periodic attempt timer 840 may expire for multiple times during the unavailability period 838, based on the value of the unavailability period 838 and the value of the periodic attempt timer 840. At the expiration of each periodic attempt timer 840, the UE 802 postpones the PLMN search (e.g., not performing the PLMN search).

When the unavailability period 838 ends, the UE 802 performs the postponed PLMN search 870. It should be noted that, based on the instruction of the response message 835 (that the UE 802 does not need to perform a further registration procedure), the UE 802 does not perform any additional registration procedure when the unavailability period 838 ends. Instead, the core network 804 considers the UE 802 to be available when the unavailability period timer 850 expires. Further, the UE 802 waits until the expiration of the periodic registration timer (indicated by the periodic registration update time 839) to send another MRU message 880 to the core network 804 to update the UE registration.

Figure 9:
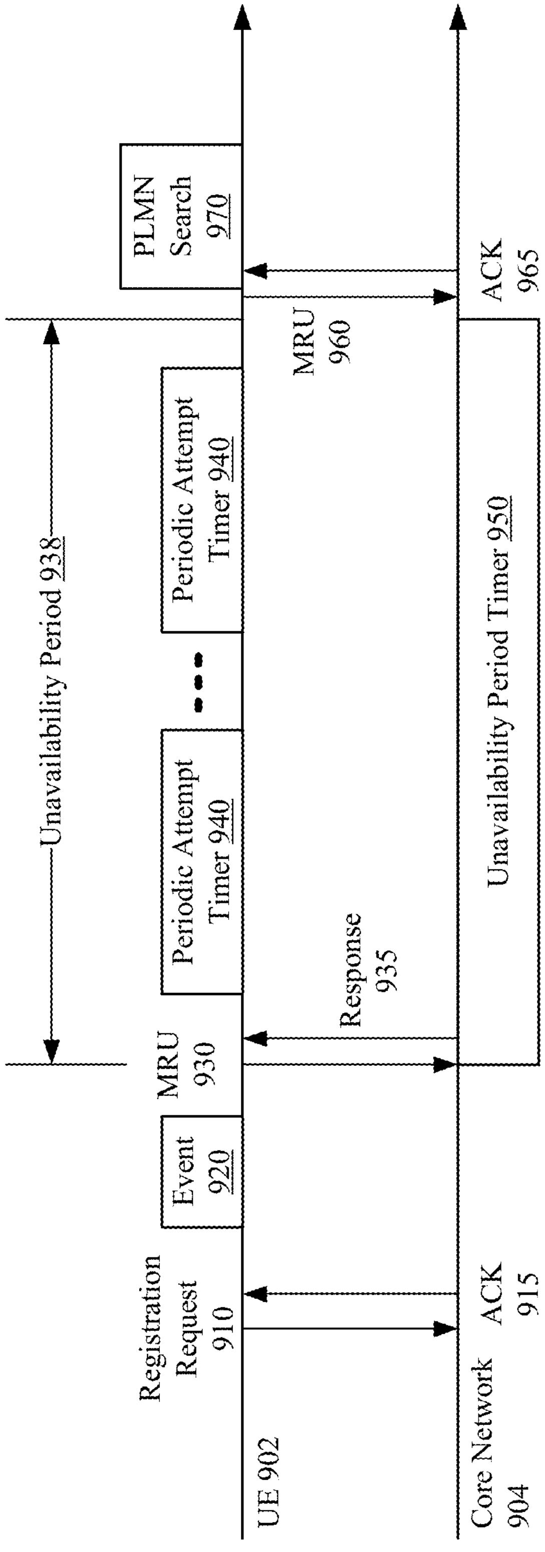
FIG. 9 is a diagram illustrating an example of a UE postponing attempts to perform PLMN search during an unavailability period duration.

FIG. 9 is a diagram illustrating an example of a UE postponing attempts to perform PLMN search during an unavailability period duration. Specifically, in the procedure 900, the UE 902 (i.e., the UE 710) utilizes a MRU message to indicate the unavailability period to the core network 904 (i.e., the core network 720), and the core network 904 acknowledges the MRU message by indicating that the UE 902 is required to perform a further registration process at the end of the unavailability period.

As shown in FIG. 9, when the UE 902 is within the NR satellite access coverage of the core network 904, the UE 902 sends a registration request 910 to the core network 904 to become registered. Upon receiving the registration request 910 from the UE 902, the core network 904 sends an acknowledgement message (i.e., ACK 915) back to the UE 902 to confirm the receipt of the registration request 910, allowing the UE 902 to enter a registered mode. As discussed, the ACK 915 may include information of a value for a periodic registration update time, such that the UE 902 may set a periodic registration timer (e.g., a T3512 timer) based on the periodic registration update time.

When the UE 902 detects an event 920 that triggers the UE 902 to enter the unavailability period, the UE 902 sends a MRU message 930 to the core network 904 to indicate information of the unavailability period 938. Specifically, the MRU message 930 may include information related to the unavailability period, such as the indication and type of unavailability, the start of the unavailability period (if known), and the UPD (if known). At the core network 904, upon receiving the MRU message 930, the core network 904 sets an unavailability period timer 950 based on the start of the unavailability period and the UPD, and sends a response message 935 back to the UE 902. In this case, the response message 935 includes information indicating that the UE 902 is required to perform a further registration procedure at the end of the unavailability period. Further, the response message 935 may also include information of an updated value for the periodic registration update time, such that the UE 902 may update the periodic registration timer with the updated value of the periodic registration update time (not shown in FIG. 9).

During the unavailability period 938, the periodic attempt timer 940 may keep running on the UE 902. It is possible that the periodic attempt timer 940 may expire for multiple times during the unavailability period 938, based on the value of the unavailability period 938 and the value of the periodic attempt timer 940. At the expiration of each periodic attempt timer 940, the UE 902 postpones the PLMN search (e.g., not performing the PLMN search).

When the unavailability period ends, the UE 902, based on the instruction of the response message 935 (that the UE 902 is required to perform a further registration procedure at the end of the unavailability period), sends another MRU message 960 to the core network 904 to perform the required registration update procedure. In this case, the UE 902 does not need to wait until the expiration of the periodic registration timer to perform another registration update procedure. Specifically, the MRU message 960 may include information confirming the completion of the unavailability period 938. At the core network 904, upon receiving the MRU message 960, the core network 904 sends a corresponding acknowledgement message (i.e., ACK 965) back to the UE 902, indicating that the core network 904 considers the UE 902 to be available due to the MRU message 960, which is received after the unavailability period timer 950 expires. Further, the UE 902 performs the postponed PLMN search 970 after the unavailability period 938 ends.

Figure 10:
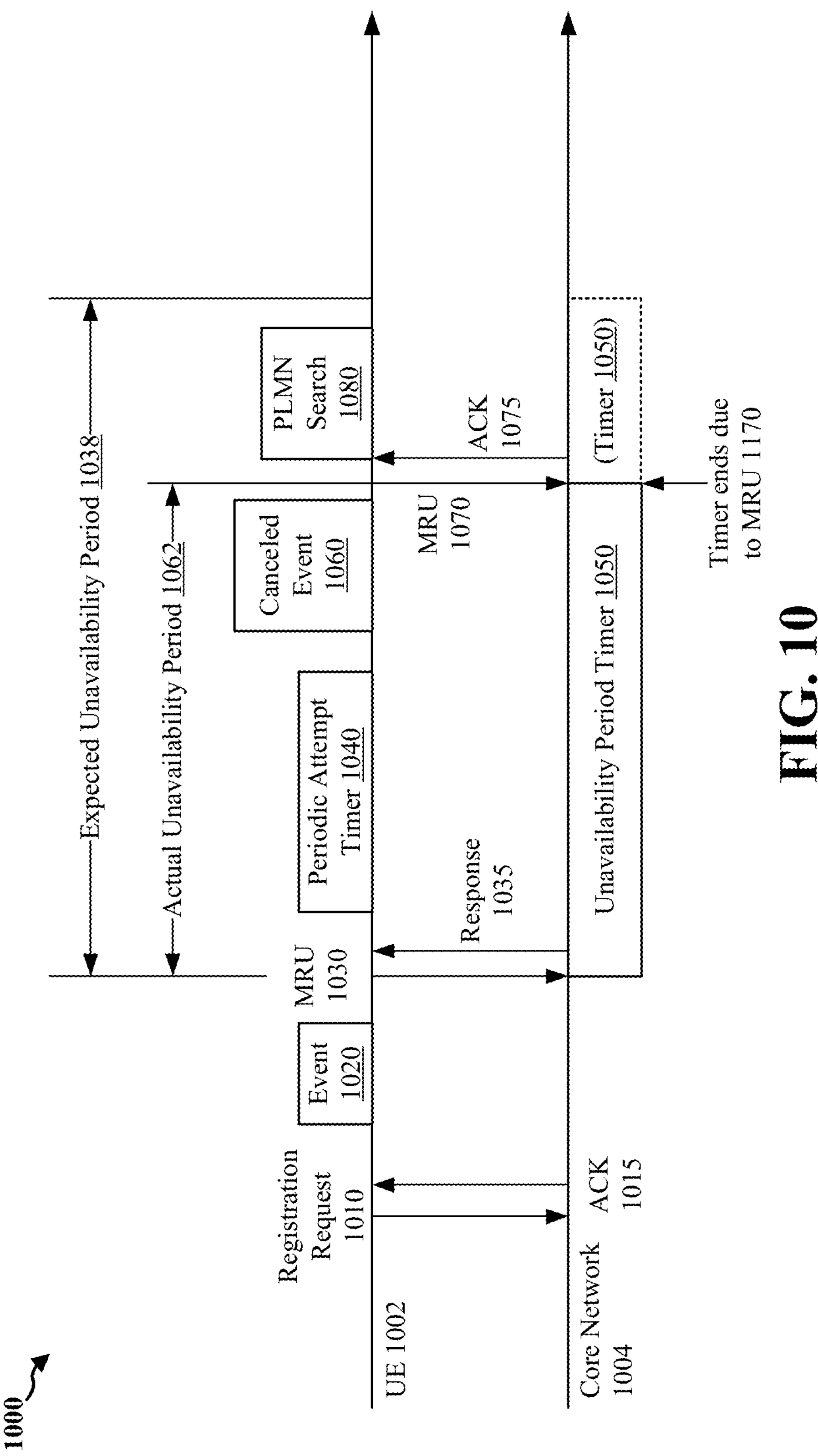
FIG. 10 is a diagram illustrating an example of a UE postponing attempts to perform PLMN search during an unavailability period duration.

FIG. 10 is a diagram illustrating an example of a UE postponing attempts to perform PLMN search during an unavailability period duration. Specifically, in the procedure 1000, the UE 1002 (i.e., the UE 710) utilizes a MRU message to indicate, to the core network 1004 (i.e., the core network 720), that the unavailability period is terminated earlier than the intended unavailability period due to the triggering event being canceled.

As shown in FIG. 10, when the UE 1002 is within the NR satellite access coverage of the core network 1004, the UE 1002 sends a registration request 1010 to the core network 1004 to become registered. Upon receiving the registration request from the UE 1002, the core network 1004 sends an acknowledgement message (i.e., ACK 1015) back to the UE 1002 to confirm the receipt of the registration request 1010, allowing the UE 1002 to enter a registered mode. As discussed, the ACK 1015 may include information of a value for a periodic registration update time, such that the UE 1002 may set a periodic registration timer (e.g., a T3512 timer) based on the periodic registration update time.

When the UE 1002 detects an event 1020 that triggers the UE 1002 to enter the unavailability period, the UE 1002 sends a MRU message 1030 to the core network 1004 to indicate information of an expected unavailability period 1038 (which may be later terminated earlier than expected). Specifically, the MRU message 1030 may include information related to the expected unavailability period 1038, such as the indication and type of unavailability, the start of the unavailability period (if known), and the expected UPD (if known). At the core network 1004, upon receiving the MRU message 1030, the core network 1004 sets an unavailability period timer 1050 based on the start of the unavailability period and the expected UPD, and sends a response message 1035 back to the UE 1002. In this case, the response message 1035 may also include information of an updated value for the periodic registration update time, such that the UE 1002 may update the periodic registration timer with the updated value of the periodic registration update time (not shown in FIG. 10). Further, the response message 1035 may include information indicating whether the UE 1002 is required to perform a further registration procedure at the end of the unavailability period.

During the expected unavailability period 1038, the periodic attempt timer 1040 may keep running on the UE 1002. At the expiration of the periodic attempt timer 1040, the UE 1002 postpones the PLMN search (e.g., not performing the PLMN search). It should be noted that, as shown in FIG. 10, due to the shorter period of time of the actual unavailability period 1062, the periodic attempt timer 1040 expires only once during the actual unavailability period 1062. However, it is possible that the periodic attempt timer 1040 may expire for multiple times during the actual unavailability period 1062, based on the value of the periodic attempt timer 1040.

During the expected unavailability period 1038, it is possible that the event 1020 triggering the unavailability period 1038 may be canceled or delayed. When the UE 1002 detects such canceled event 1060, the UE 1002 may send another MRU message 1070 to the core network 1004 to indicate that the unavailable period is terminated earlier than expected (i.e., the actual unavailable period 1062 is shorter than the expected unavailability period 1038). Specifically, the MRU message 1070 may include information indicating the early termination of the unavailability period 1038 and other information related to the cause of the early termination (e.g., information showing that the unavailability period ends earlier due to the canceled event 1060). At the core network 1004, upon receiving the MRU message 1070, the core network 1004 terminates the unavailability period timer 1050 due to the MRU message 1070, and sends a corresponding acknowledgement message (i.e., ACK 1075) back to the UE 1002, indicating that the core network 1004 considers the UE 1002 to be available due to the MRU message 1070. Further, the UE 1002 performs the postponed PLMN search 1080 after the actual unavailability period 1062 ends.

It should be noted that, in the procedures 800, 900 and 1000, the UE uses the MRU message (which is for performing a registration update procedure) to activate the unavailability period, i.e., indicating to the core network the information related to the unavailability period (e.g., the indication and type of unavailability, the start of the unavailability period, and the UPD). However, depending on the state of the UE before entering the unavailability period, the registration update procedure may be replaced by an initial registration procedure, e.g., a registration request message similar to the registration request message 730.

Figure 11:
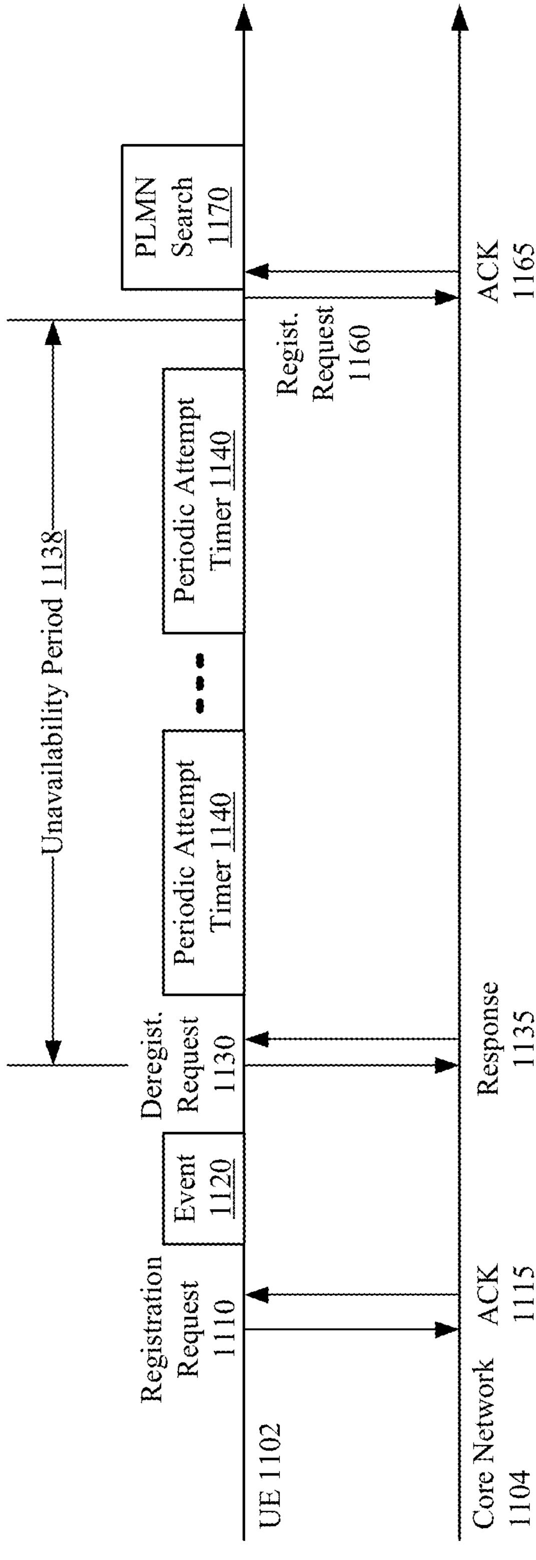
FIG. 11 is a diagram illustrating an example of a UE postponing attempts to perform PLMN search during an unavailability period duration.

FIG. 11 is a diagram illustrating an example of a UE postponing attempts to perform PLMN search during an unavailability period duration. Specifically, in the procedure 1100, the UE 1102 (i.e., the UE 710) utilizes a deregistration request message to indicate the unavailability period to the core network 1104 (i.e., the core network 720). In this case, since the UE 1102 is deregistered, it is required that the UE 1102 performs a further registration process at the end of the unavailability period to be back to the registered mode.

As shown in FIG. 11, when the UE 1102 is within the NR satellite access coverage of the core network 1104, the UE 1102 sends a registration request 1110 to the core network 1104 to become registered. Upon receiving the registration request 1110 from the UE 1102, the core network 1104 sends an acknowledgement message (i.e., ACK 1115) back to the UE 1102 to confirm the receipt of the registration request 1110, allowing the UE 1102 to enter a registered mode. As discussed, the ACK 1115 may include information of a value for a periodic registration update time, such that the UE 1102 may set a periodic registration timer (e.g., a T3512 timer) based on the periodic registration update time.

When the UE 1102 detects an event 1120, e.g., that the UE 1102 moves to a location such that it is losing satellite access coverage of the core network 1104, such event 1120 triggers the UE 1102 to enter the unavailability period. Thus, the UE 1102 sends a deregistration request message 1130 to the core network 1104 to perform deregistration. Specifically, since the UE 1102 chooses to send the deregistration request message 1130 (and not the MRU message) with the intent to deregister, there is no need for the UE 1102 to include information related to the unavailability period 1138 (e.g., the indication and type of unavailability, the start of the unavailability period and the UPD) in the deregistration request message 1130. At the core network 1104, upon receiving the deregistration request message 1130, the core network 1104 sends a response message 1135 back to the UE 1102 to acknowledge the deregistration request message 1130. It should be noted that the core network 1104 does not set an unavailability period timer, as there is no guarantee that the UE 1120 will become registered again in the future. In this case, the response message 1135 does not need to include information of an updated value for the periodic registration update time or information indicating whether the UE 1102 is required to perform a further registration procedure at the end of the unavailability period 1138.

During the unavailability period 1138, the periodic attempt timer 1140 may keep running on the UE 1102. It is possible that the periodic attempt timer 1140 may expire for multiple times during the unavailability period 1138, based on the value of the unavailability period 1138 and the value of the periodic attempt timer 1140. At the expiration of each periodic attempt timer 1140, the UE 1102 postpones the PLMN search (e.g., not performing the PLMN search).

When the unavailability period 1138 ends, if the UE 1102 moves back to be within the NR satellite access coverage of the core network 1104, the UE 1102 may send another registration request 1160 to the core network 1104 to become registered again. Upon receiving the registration request 1160 from the UE 1102, the core network 1104 sends an acknowledgement message (i.e., ACK 1165) back to the UE 1102 to confirm the receipt of the registration request 1160, allowing the UE 1102 to re-enter the registered mode. Similar to the ACK 1115, the ACK 1165 may include information of a value for a periodic registration update time, such that the UE 1102 may set a periodic registration timer (e.g., a T3512 timer) based on the periodic registration update time. Further, the UE 1102 performs the postponed PLMN search 1170 after the unavailability period 1138 ends.

It should be noted that, in the procedure 1100, the UE 1102 moves back to be within the NR satellite access coverage of the core network 1104 after the unavailability period 1138 ends. If the UE 1102 moves back to be within the NR satellite access coverage of the core network 1104 during the unavailability period 1138, the UE 1102 may consider that the loss of coverage no longer applies. Thus, the UE 1102 may choose to end the unavailability period 1138 earlier than expected by sending the registration request 1160 to the core network 1104 to become registered again. In this case, the UE 1102 may then perform the postponed PLMN search due to the earlier termination of the unavailability period 1138.

Further, it is possible that the procedures 800, 900, 1000 and 1100 may be combined to form a complex procedure. In this case, whenever the UE sends a new request message (e.g., a MRU message, an initial registration request or a deregistration request) triggered by a new event to the core network to indicate a new unavailability period, the core network may have update/re-negotiate the unavailability period indicated by the new request message accordingly. For example, in the procedure 800, when the UE 802 is already in the middle of the unavailability period 838, it is possible that the UE 802 may move to a location such that it is losing satellite access coverage of the core network 804 (similar to the event 1120). In this case, the UE 802 may send a deregistration request (similar to the deregistration request 1130) to the core network 804 with an updated unavailability period triggered by this new event. At the core network 804, upon receiving such deregistration request, the core network 804 may discard the unavailability period 850 and other information related to the unavailability period indicated by the previously received MRU message 830. At the UE 802, the postponed PLMN search will be performed at the end of the updated unavailability period.

With the periodic attempts to perform the PLMN search being postponed during the unavailability period, the UE may avoid performing the PLMN search during the corresponding UE-specific events (e.g., critical events such as software updates or power saving events such as deactivation of radio power of the UE) while the UE may keep the periodic attempt timer running during the unavailability period.

Figure 12:
FIG. 12 is a flow chart of a method (process) of wireless communication of a UE.
Figure 12:
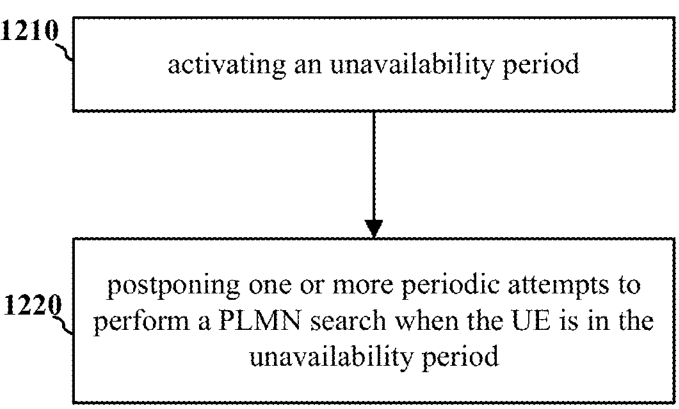

FIG. 12 is a flow chart of a method (process) of wireless communication of a UE. The method may be performed by a UE, e.g., the UE 710. At operation 1210, the UE activates an unavailability period. At operation 1220, the UE postpones one or more periodic attempts to perform a PLMN search when the UE is in the unavailability period. In certain embodiments, each of the one or more periodic attempts to perform the PLMN search is controlled by a periodic attempt timer running when the unavailability period is activated. In one embodiment, expiration of the periodic attempt timer during a duration of the unavailability period does not trigger the UE to perform the PLMN search.

In certain embodiment, the one or more periodic attempts to perform the PLMN search are postponed by: when the periodic attempt timer expires during a duration of the unavailability period, attempting to perform periodic scan or attempting to access a HPLMN or an EHPLMN only after the unavailability period ends. Alternatively, in certain embodiments, the one or more periodic attempts to perform the PLMN search are postponed by: when the periodic attempt timer expires during a duration of the unavailability period, not attempting to perform periodic scan or attempting to access a HPLMN or an EHPLMN during the duration of the unavailability period.

Figure 13:
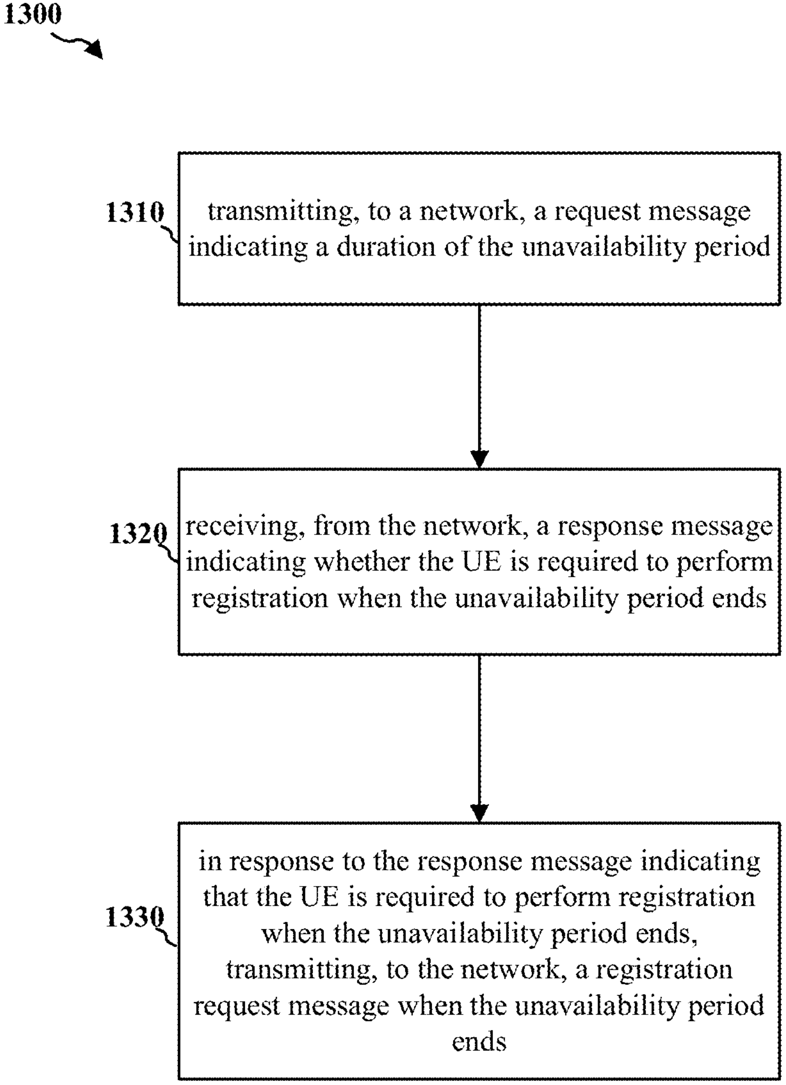
FIG. 13 is a flow chart of a method (process) of wireless communication of a UE.

FIG. 13 is a flow chart of a method (process) of wireless communication of a UE. The method may be performed by a UE, e.g., the UE 710. At operation 1310, the UE activates the unavailability period by transmitting, to a network, a request message indicating a duration of the unavailability period. In one embodiment, the request message is a mobility registration update message. In another embodiment, the request message is a UE-initiated deregistration message. At operation 1320, the UE receives, from the network, a response message indicating whether the UE is required to perform registration when the unavailability period ends. In certain embodiments, the response message further indicates a periodic registration update time, and the periodic registration update time is longer than or equal to the duration of the unavailability period. At operation 1330, in response to the response message indicating that the UE is required to perform registration when the unavailability period ends, the UE transmits, to the network, a registration request message when the unavailability period ends.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean “one and only one” unless specifically so stated, but rather “one or more.” The word “exemplary” is used herein to mean “serving as an example, instance, or illustration.” Any aspect described herein as “exemplary” is not necessarily to be construed as preferred or advantageous over other aspects. Unless specifically stated otherwise, the term “some” refers to one or more. Combinations such as “at least one of A, B, or C,” “one or more of A, B, or C,” “at least one of A, B, and C,” “one or more of A, B, and C,” and “A, B, C, or any combination thereof” include any combination of A, B, and/or C, and may include multiples of A, multiples of B, or multiples of C. Specifically, combinations such as “at least one of A, B, or C,” “one or more of A, B, or C,” “at least one of A, B, and C,” “one or more of A, B, and C,” and “A, B, C, or any combination thereof” may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:

in response to detecting an event at the UE, activating an unavailability period by transmitting, to a network, a request message indicating a duration of the unavailability period;

keeping a periodic attempt timer running during the unavailability period, wherein the periodic attempt timer is configured to trigger a Public Land Mobile Network (PLMN) search; and postponing one or more periodic attempts to perform the PLMN search upon determining that the UE is in the unavailability period, wherein the UE refrains from performing the PLMN search after the periodic attempt timer expires during the unavailability period.

2. The method of claim 1, wherein the request message is a mobility registration update message.

3. The method of claim 1, wherein the request message is a UE-initiated deregistration message.

4. The method of claim 1, further comprising:

receiving, from the network, a response message indicating whether the UE is required to perform registration when the unavailability period ends; and in response to the response message indicating that the UE is required to perform registration when the unavailability period ends, transmitting, to the network, a registration request message when the unavailability period ends.

5. The method of claim 4, wherein the response message further indicates a periodic registration update time, and the periodic registration update time is longer than or equal to the duration of the unavailability period.

6. The method of claim 1, wherein expiration of the periodic attempt timer during the unavailability period does not trigger the UE to perform the PLMN search.

7. The method of claim 1, wherein the one or more periodic attempts to perform the PLMN search are postponed by:

when the periodic attempt timer expires during the unavailability period, attempting to perform periodic scan or attempting to access a home PLMN (HPLMN) or an equivalent PLMN (EHPLMN) only after the unavailability period ends.

8. The method of claim 1, wherein the one or more periodic attempts to perform the PLMN search are postponed by:

when the periodic attempt timer expires during the unavailability period, not attempting to perform periodic scan or attempting to access a home PLMN (HPLMN) or an equivalent PLMN (EHPLMN) during the unavailability period.

9. An apparatus for wireless communication, the apparatus being a user equipment (UE), comprising:

a memory; and at least one processor coupled to the memory, the processor being configured to:

in response to detecting an event at the UE, activate an unavailability period by transmitting, to a network, a request message indicating a duration of the unavailability period;

keep a periodic attempt timer running during the unavailability period, wherein the periodic attempt timer is configured to trigger a Public Land Mobile Network (PLMN) search; and postpone one or more periodic attempts to perform the PLMN search upon determining that the UE is in the unavailability period, wherein the UE refrains from performing the PLMN search after the periodic attempt timer expires during the unavailability period.

10. The apparatus of claim 9, wherein the request message is a mobility registration update message.

11. The apparatus of claim 9, wherein the request message is a UE-initiated deregistration message.

12. The apparatus of claim 9, wherein the processor is further configured to:

receive, from the network, a response message indicating whether the UE is required to perform registration when the unavailability period ends; and in response to the response message indicating that the UE is required to perform registration when the unavailability period ends, transmit, to the network, a registration request message when the unavailability period ends.

13. The apparatus of claim 12, wherein the response message further indicates a periodic registration update time, and the periodic registration update time is longer than or equal to the duration of the unavailability period.

14. The apparatus of claim 9, wherein expiration of the periodic attempt timer during the unavailability period does not trigger the UE to perform the PLMN search.

15. The apparatus of claim 9, wherein the one or more periodic attempts to perform the PLMN search are postponed by:

when the periodic attempt timer expires during the unavailability period, attempting to perform periodic scan or attempting to access a home PLMN (HPLMN) or an equivalent PLMN (EHPLMN) only after the unavailability period ends.

16. The apparatus of claim 9, wherein the one or more periodic attempts to perform the PLMN search are postponed by:

when the periodic attempt timer expires during the unavailability period, not attempting to perform periodic scan or attempting to access a home PLMN (HPLMN) or an equivalent PLMN (EHPLMN) during the unavailability period.

* * * * *